G. W. PYBUS.
NUT LOCK.
APPLICATION FILED JUNE 16, 1913.
1,091,959.
Patented Mar. 31, 1914.
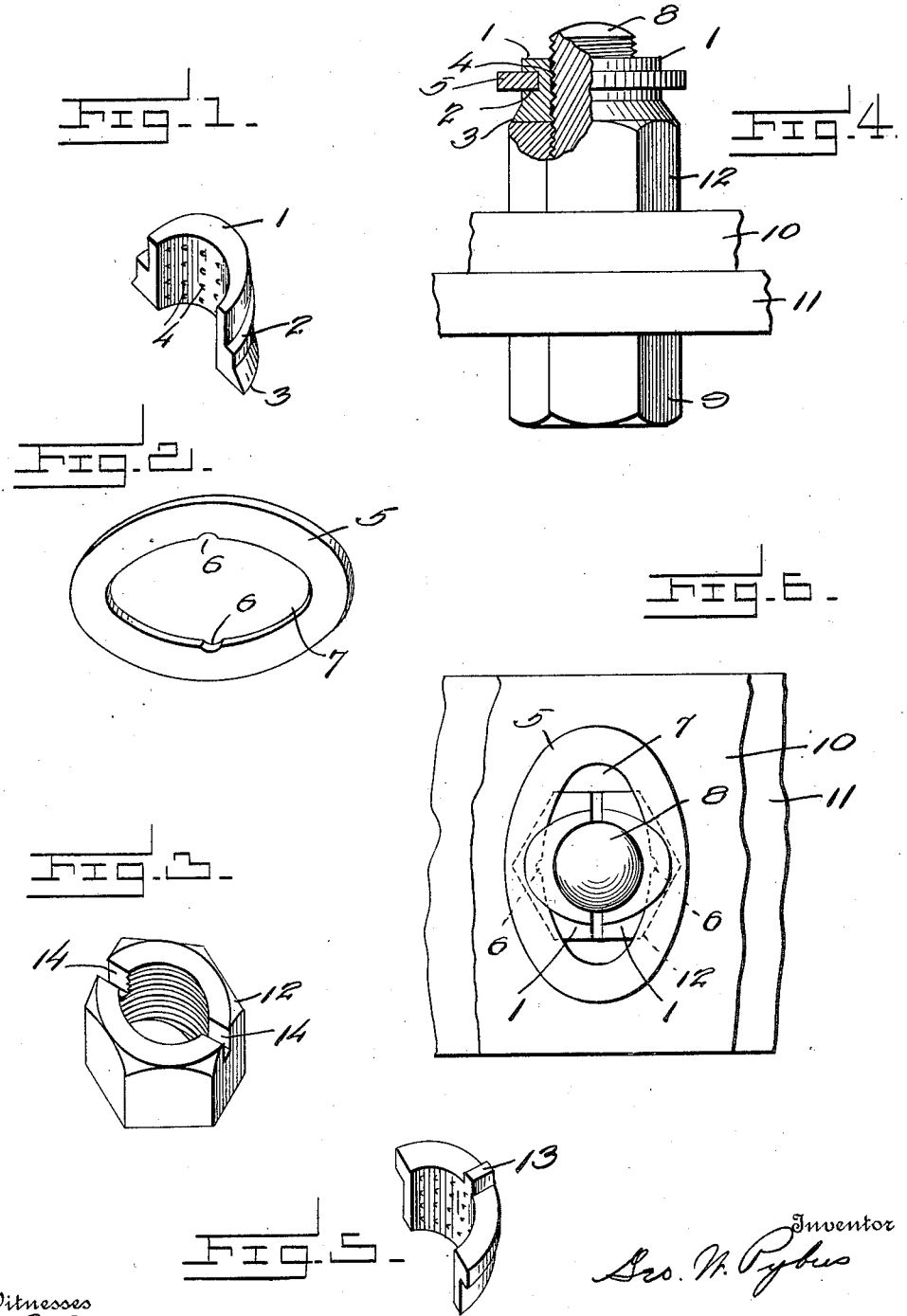

UNITED STATES PATENT OFFICE.

GEORGE WILLIAM PYBUS, OF TORONTO, ONTARIO, CANADA.

NUT-LOCK.

1,091,959. Specification of Letters Patent. Patented Mar. 31, 1914.

Application filed June 16, 1913. Serial No. 773,893.

*To all whom it may concern:*

Be it known that I, GEORGE WILLIAM PYBUS, a subject of the King of Great Britain, and resident of 24 Montrose avenue, in the city of Toronto, county of York, Province of Ontario, in the Dominion of Canada, mechanic, have invented certain new and useful Improvements in Nut-Locks, of which the following is a specification.

The invention relates to improvements in nut locks, as described in the present specification and illustrated in the accompanying drawings that form part of the same.

The invention consists essentially in the novel means employed whereby the co-action of a split sleeve and an oval washer effectively lock the nut to its home position.

The objects of the invention are to devise a reliable form of lock whereby the nuts on railway joints and other places cannot become loose from the effects of vibration, to eliminate bolts of special construction so frequently used in nut locks, and generally to provide a simple form of nut lock that will be cheap to manufacture and of a durable nature.

In the drawings, Figure 1 is a perspective view of one half of the split sleeve. Fig. 2 is a perspective view of the oval washer. Fig. 3 is a perspective view of a particular form of nut that may be used in this invention. Fig. 4 is an elevation of the assembled parts showing the nut, bolt, washer and split sleeve partially in section. Fig. 5 is a perspective view showing the form of split sleeve used with the particular form of nut illustrated in Fig. 3. Fig. 6 is a plan view of the assembled parts.

Like numerals of reference indicate corresponding parts in each figure.

Referring to the drawings, 1 is a split sleeve formed of the two parts identical in every respect, each part having in the outer wall thereof the groove 2 and at the inner end thereof the flange 3, the interior wall of said parts of the sleeve having the teeth 4 or other suitable surface. This inner wall may if necessary be lined with a fibrous material or composition to prevent the burring of the threads on the bolt 7.

5 is the oval washer having the centrally arranged notches 6 therein and having the oval central hole 7 into which the parts of the split sleeve 1 fit, said washer being of sufficient thickness to fit snugly in the grooves 2.

8 is a bolt here shown as having the head 9 and joining the pieces 10 and 11 together, said bolt being threaded and having the nut 12 mounted on the threaded end and screwed up tightly to the piece 10.

The split sleeve 1 is mounted on the extending threaded end of the bolt beyond the nut 12 and secured tightly up against the outer face of the nut, the said bolt spreading the two parts of the sleeve and forcing said sleeve into a substantially oval shape, the oval washer is then mounted on said sleeve and turned until the narrow part of the oval washer is brought into engagement with the ends of the oval sleeve which forces the parts of the sleeve tightly to the projecting threaded end of the bolt and absolutely prevents any movement of the nut 12, the notches 6 forming a variation in the line of the oval washer and preventing the said washer from slipping off.

In Figs. 3 and 5 the only difference is that an additional lock is formed by the teats 13 on the sleeve projecting in the hole 14 in the nut, otherwise the construction is precisely the same.

It will of course be readily seen that the bolt spreads the parts of the sleeve making the diametrical measurement greater than it otherwise would be, consequently the turning of the washer forces the parts closer together and at the same time embraces the bolts more tightly.

What I claim is:—

1. In a nut lock, the combination with a bolt and nut mounted on the threaded end of said bolt, of a split sleeve formed of a plurality of parts and an elongated washer having a substantially oval hole and engaging the outer walls of said parts and drawing them closely to the projecting portion of the bolt beyond the nut.

2. In a nut lock, the combination with a bolt having a threaded portion and a nut mounted on said threaded portion, of a split sleeve formed of two parts, each of said parts having a groove in the outer wall thereof and an interior wall having suitable means therein for gripping the threaded portion of said bolt, and an elongated washer having a central oval hole and engaging said sleeve parts in said groove, and adapted to force said sleeve parts tightly against the threaded portion of the bolt immediately adjoining the outer face of said nut.

3. In a device of the class described, in combination, a bolt having a threaded end portion, a nut mounted on said threaded end portion having slots in the outer face thereof, a split sleeve formed of two parts each having a teat projecting into one of said slots, and a washer having a substantially oval hole therein and engaging the outer wall of said sleeve parts and forcing them closely to said bolt immediately adjoining said nut.

Signed at the city of Toronto, Ont., this 21st day of April, 1913.

GEORGE WILLIAM PYBUS.

Witnesses:
W. G. HAMMOND,
D. S. TOVELL.

Copies of this patent may be obtained for five cents each, by addressing the "Commissioner of Patents, Washington, D. C."